June 6, 1967  TIMOTHY TUNG JEN YOUNG  3,323,812
DRIVE MECHANISM FOR A BICYCLE OR THE LIKE
Filed May 24, 1965
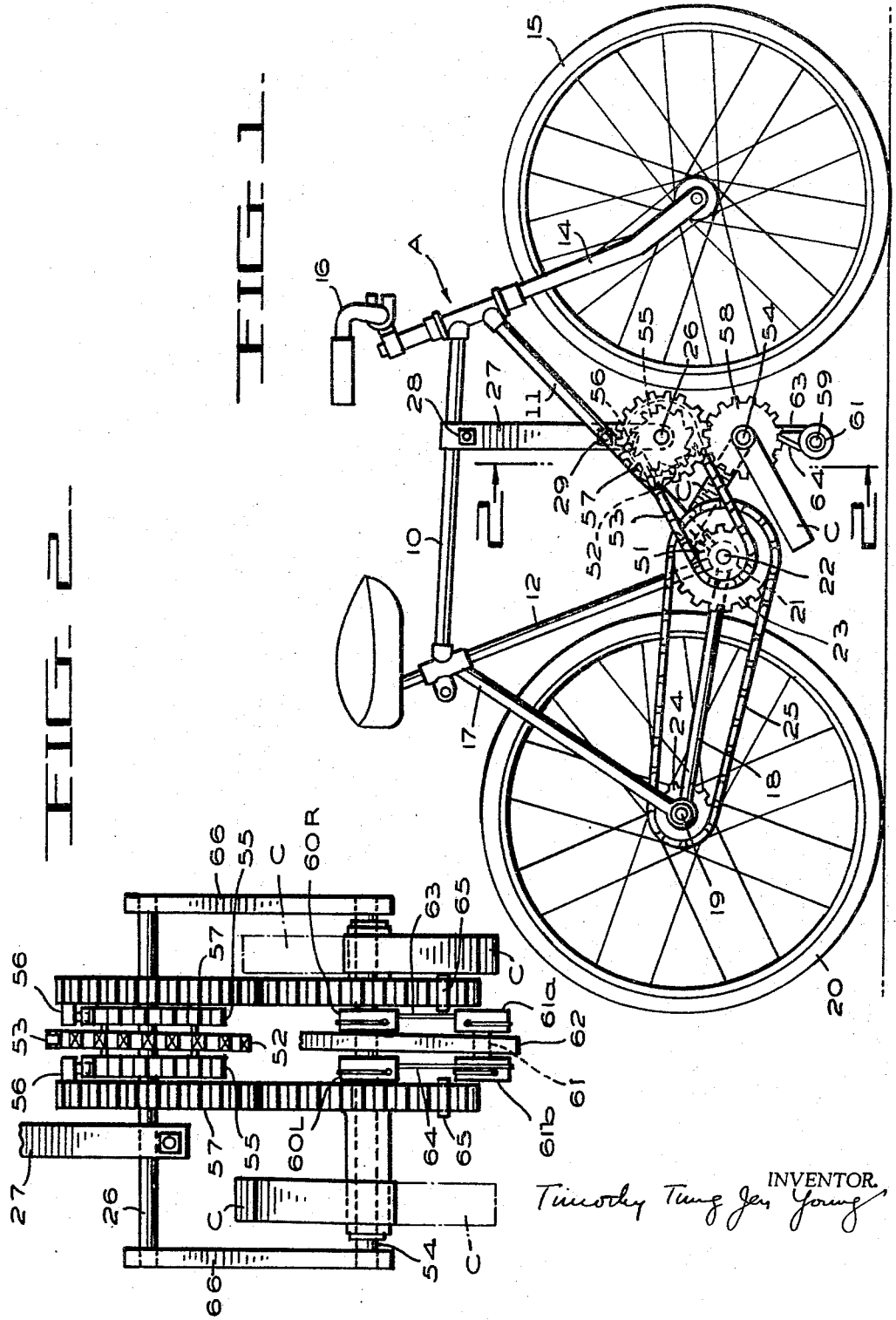
INVENTOR.
Timothy Tung Jen Young

United States Patent Office 3,323,812
Patented June 6, 1967

3,323,812
DRIVE MECHANISM FOR A BICYCLE
OR THE LIKE
Timothy Tung Jen Young, 1212 Olive St.,
San Carlos, Calif. 94070
Filed May 24, 1965, Ser. No. 458,172
7 Claims. (Cl. 280—258)

The present application relates to the improvements upon the Patent No. 3, 083,985 issued to me by the United States Patent Office Apr. 2, 1963, which since was returned and re-issued May 18, 1965, Re. No. 25,783.

As the object of the present modified form of my invention, it is proposed to provide for power to be generated away from the drive axle, and for a transmission consisting of a sprocket chain trained over two identical sprocket wheels arranged in such a way that it would be more efficient in the transmission of generated power, and for the power to be distributed evenly over the whole mechanism to impart energy to the drive sprocket at the drive axle to drive the bicycle or the like.

Other objects and advantages will appear as the specification continues. The novel feature of the present invention will be particularly set forth in the appended claims.

Drawing

For a better understanding of the invention, reference should be had to the accompanying drawing, forming part of this specification, in which:

FIGURE 1 is a side elevation view of a bicycle equipped with my modified improved drive mechanism, and looking at the right side of the bicycle;

FIGURE 2 is an enlarged sectional view taken along the vertical planes 2—2.

While I have shown only the preferred form of my invention, it should be understood that various changes, or modifications, may be made within the scope of the annexed claims, without departing from the spirit thereof.

Detailed description

Referring now to the drawing in detail, I have disclosed a conventional bicycle having a supporting frame A having an upper tube 10, a lower front tube 11 that is inclined relative to the horizontal, and a rear upwardly extending tube 12. Moreover, the supporting frame has a front fork 14 journalled therein and this fork is provided with a front wheel 15 which may be steered by handle bars 16. Upper and lower rear forks 17 and 18, respectively, of the supporting frame A has an axle 19 mounted thereon for a rear wheel 20.

As shown in FIGURE 1, the tubes 11 and 12 and the fork 18 provide a support for a transverse bearing tube 21. It will be apparent from FIGURE 1 that a drive shaft 22 is journalled in this bearing tube and has a drive sprocket 23 fixed thereto. The ground engagement rear wheel 20 is provided with a driven sprocket 24 on its axle 19, and a chain 25 is trained over the drive and driven sprockets 23 and 24, respectively so that rotation of the drive sprocket will actuate the driven sprocket to propel the bicycle, or the like.

The parts thus far described are conventional and now I shall set forth my modified improved drive mechanism in detail, as follows:

It will be seen from FIGURES 1 and 2 that an attachment shaft 26 is mounted on the supporting frame A to extend transversely thereof. For the purpose of mounting the shaft 26, the upper shaft, I have secured a bracket 27 to the upper tube 10 and to the lower front tube 11 by clamping bolts 28 and 29.

One sprocket driven-drive wheel 51 is fixed to the driving shaft 22 alongside the drive sprocket 23, on the right side of the bicycle.

Another drive sprocket wheel 52 of the same diameter and diameter pitch as that of the driven-drive sprocket 51 is rotatably disposed on the attachment shaft 26, and an endless sprocket chain 53 is trained over the drive sprocket wheel 52 and the driven-drive sprocket wheel 51 respectively so that rotation of the drive sprocket 52 and driven-drive sprocket 51 will actuate the drive sprocket 23 which in turn will actuate the driven sprocket 24 at the rear wheel to propel the bicycle or the like.

A pair of ratchet wheels 55 are fixed one on each side of the drive sprocket 52, also rotatably disposed on the attachment shaft 26, all three, sprocket wheel 52 and ratchet wheels 55 rotating as a single piece.

A pair of driven spur gear 57 are rotatably disposed for oscillation on the attachment shaft 26, each adjacent to each of the ratchet wheels 55, and a spring-pressed pawl 56 carried by each of the driven spur gear 57 is each operatively engaged with the ratchet wheel 55 adjacent to it to actuate the drive sprocket wheel 52.

Another attachment shaft 54, the lower shaft, is mounted on bracket 62 secured to tube 11 and 12 by bolts (not shown in drawing) with both of its ends resting at end bracket 66, as are the ends of shaft 26 resting on end bracket 66, the attachment shafts 26 and 54 being parallel one to the other.

On this attachment shaft 54 another pair of drive spur gear 58 each in mesh with the driven spur gear 57 on shaft 26 are rotatably disposed for oscillation, and with the foot rests C fixed to each of these drive spur gears 58, the foot rests extending rearward from the transverse attachment shaft 54.

In order to interconnect the foot rests C each fixed to a spur gear 58 on attachment shaft 54, one on each side, so that when one is depressed the other will be elevated and vice versa, I have provided a pair of pulleys 60R and 60L, one fixed to each of the drive spur gears 58, and a pulley 61 with the same pitch diameter and diameter pitch as that of the pulleys 60R and 60L, and pulley 61 with sheaves 61a and 61b rotatably disposed on pin shaft 59, mounted also on bracket 62. To pulley 60R a cable 63 one end of it at 60a is wound clockwise, and the other end of the cable 63 to pulley 61, wound counter clockwise from 61a in pulley 61. To pulley 60L another cable 64 is fixed one end at 60b wound clockwise and the other end wound counter-clockwise at 61b pulley 61, as shown in detail in FIGURE 2.

To limit the extent of oscillation by drive spur gear 58 I have provided a clamp as stop 65, to one or more teeth of the drive spur gear 58.

I claim:
1. The combination with a bicycle, or the like, having a supporting frame provided with a transverse bearing tube, a drive shaft journalled in this bearing tube and having a drive sprocket fixed thereto, a ground-engaging wheel provided with a drive sprocket, and an endless sprocket chain trained over the drive and driven sprockets respectively so that rotation of the drive sprocket will actuate the driven sprocket to propell the bicycle, or the like, of a drive mechanism comprising:

(a) Two attachment shafts mounted in parallel, an upper and a lower, on the supporting frame to extend transversely thereof;

(b) A sprocket wheel rotatably disposed on the upper attachment shaft;

(c) A pair of ratchet wheels fixed one on each side of the sprocket wheel and rotatably disposed on the upper attachment shaft;

(d) A pair of driven spur gear rotatably disposed on the upper attachment shaft for oscillation one on each side of each of the ratchet wheels and each spur gear carrying a spring pressed pawl operatively engaging with an adjacent ratchet wheel to actuate the ratchet wheel and therefore the drive sprocket wheel;

(e) A pair of drive spur gears rotatably disposed for oscillation on the lower attachment shaft and each drive spur gear in mesh with a driven spur gear on the upper attachment shaft;

(f) A pair of foot rests each secured to an adjacent drive spur gear on the lower attachment shaft, and whereby each foot rest may be depressed to impart a corresponding movement to its respective driven spur gear;

(g) A driven drive sprocket wheel fixed to the drive shaft of the bearing tube;

(h) An endless sprocket chain trained over the driven drive sprocket wheel on the bearing tube and the sprocket wheel on the upper attachment shaft;

(i) Means for interconnecting the movements of the foot rests C.

2. The combination as set forth in claim 1; and in which the two transverse attachment shafts and drive and driven gears and foot rests being arranged in front of the drive shaft of the bearing tube, and with foot rests extending rearwardly from the lower transverse attachment shaft; and with the two transverse attachment shafts arranged in parallel one to the other; and in which the power is generated away from and is transmitted to the drive shaft through an endless sprocket chain trained over two identical sprocket wheels.

3. The combination as set forth in claim 1; and in which a racket is secured to upper and lower tubes of the supporting frame and with the upper transverse attachment shaft being mounted thereon; and another bracket secured to the rear upwardly extending tube and the lower tubes and with the lower transverse attachment shaft mounted thereon, and with the upper and lower transverse attachment shafts arranged in parallel.

4. The combination as set forth in claim 1; and in which means for interconnecting the movements of the foot rests consists of two cables wound systematically each at one end to a pulley connected to a foot rest and at the other end to a sheave of another pulley running on a pin shaft parallel to the lower attachment shaft.

5. The combination as set forth in claim 1; and in which each of the drive spur gears is provided with a stop in the form of a clamp fixed to a certain number of teeth of the drive spur gear to limit the oscillation of the drive spur gear.

6. The combination as set forth in claim 1; and in which the drive spur gear which is in mesh with the driven drive spur gear on the upper attachment shaft is rotatably disposed on the lower attachment shaft, and this lower attachment shaft has its center in line with the centers of the drive shaft and the shaft which is the axle of the sprocket at the rear wheel of the bicycle.

7. The combination set forth in claim 1; and in which the foot rests extending rearward are pressed down with the heels of the feet when starting and accelerating, and when accelerated, with the balls of the feet, thus reducing the angular displacement distance.

References Cited

UNITED STATES PATENTS

| | | | |
|---|---|---|---|
| 683,037 | 9/1901 | Gourny-Wysocki | 280—258 |
| 3,083,985 | 4/1963 | Young | 280—258 |

KENNETH H. BETTS, *Primary Examiner.*